United States Patent
Schlemmer-Kelling (10) Patent No.: US 8,919,121 B2
(45) Date of Patent: Dec. 30, 2014

(54) TURBOCHARGED ENGINE WITH EXHAUST GAS RECYCLING

(75) Inventor: Udo Schlemmer-Kelling, Molfsee (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 537 days.

(21) Appl. No.: 13/201,657

(22) PCT Filed: Feb. 15, 2010

(86) PCT No.: PCT/EP2010/000924
§ 371 (c)(1),
(2), (4) Date: Aug. 16, 2011

(87) PCT Pub. No.: WO2010/091891
PCT Pub. Date: Aug. 19, 2010

(65) Prior Publication Data
US 2011/0302919 A1  Dec. 15, 2011

(30) Foreign Application Priority Data
Feb. 16, 2009 (EP) .................................. 09002111

(51) Int. Cl.
*F02B 33/44* (2006.01)
*F02M 25/07* (2006.01)
(Continued)

(52) U.S. Cl.
CPC ............. *F02M 25/0711* (2013.01); *Y02T 10/16* (2013.01); *F02B 37/007* (2013.01);
(Continued)

(58) Field of Classification Search
CPC .. F02B 37/001; F02B 37/007; F02B 29/0406; F01N 5/04; F01N 13/107; F02M 25/0711; F02M 25/0722; F02M 25/0739; F02M 25/0747; F02M 25/0748; F02M 25/0723; Y02T 10/121; Y02T 10/144; Y02T 10/16
USPC .................... 60/605.2, 612; 123/562, 568.12, 123/568.18, 184.21, 184.38
IPC ...................................................... F02M 35/104
See application file for complete search history.

(56) References Cited

U.S. PATENT DOCUMENTS

| 4,693,226 A | 9/1987 | Choma ..................... 123/568.17 |
| 5,564,275 A * | 10/1996 | Codan et al. .................. 60/605.2 |

(Continued)

FOREIGN PATENT DOCUMENTS

| DE | 19603591 | 3/1997 | ............. F02M 25/07 |
| DE | 102008014168 | 9/2008 | ............. F02M 25/07 |

(Continued)

OTHER PUBLICATIONS

Machine Translation to Sumser et al. (FR 2744491 A1 ), published on Aug. 8, 1997.*

(Continued)

*Primary Examiner* — Thai Ba Trieu
(74) *Attorney, Agent, or Firm* — Baker Hostetler (57) ABSTRACT

The present disclosure refers to a turbocharged internal combustion engine with exhaust gas recycling, comprising an intake manifold, an exhaust manifold, a fresh air turbocharger and an exhaust supercharger, wherein the intake manifold is divided by a separating wall into a fresh air passage and an exhaust passage, one of the passages being connected to inlet openings of cylinders of the engine, the fresh air passage being connected to the outlet of the compressor of the fresh air turbocharger, the exhaust passage being connected to the outlet of the compressor of the exhaust supercharger and the separating wall being formed with orifices connecting the two passages.

10 Claims, 8 Drawing Sheets

(51) Int. Cl.
*F02B 33/00* (2006.01)
*F02M 35/10* (2006.01)
*F02B 37/007* (2006.01)
*F02B 37/00* (2006.01)
*F01N 5/04* (2006.01)
*F01N 13/10* (2010.01)
*F02B 29/04* (2006.01)

(52) U.S. Cl.
CPC ......... *F02B 37/001* (2013.01); *F02M 25/0748* (2013.01); *F01N 13/107* (2013.01); *F02B 29/0406* (2013.01); *Y02T 10/144* (2013.01); *F02M 25/0727* (2013.01); *F02M 25/0747* (2013.01); *Y02T 10/121* (2013.01); *F02M 25/0723* (2013.01); *F01N 5/04* (2013.01); *F02M 25/0739* (2013.01); *F02M 25/0722* (2013.01)
USPC ....... 60/605.2; 60/612; 123/562; 123/568.18; 123/184.21; 123/184.38

(56) References Cited

U.S. PATENT DOCUMENTS

| | | | | |
|---|---|---|---|---|
| 6,138,649 | A * | 10/2000 | Khair et al. | 60/605.2 |
| 6,435,166 | B1 | 8/2002 | Sato et al. | 60/605.2 |
| 8,051,841 | B2 * | 11/2011 | Pantow et al. | 123/568.12 |
| 2007/0119171 | A1 * | 5/2007 | Boyapati et al. | 60/602 |
| 2010/0107629 | A1 * | 5/2010 | Gladden et al. | 60/605.2 |
| 2011/0083641 | A1 * | 4/2011 | Gokhale et al. | 60/605.2 |
| 2011/0174279 | A1 * | 7/2011 | Ito | 123/568.18 |
| 2013/0118433 | A1 * | 5/2013 | Tochizawa | 123/184.21 |
| 2013/0180507 | A1 * | 7/2013 | Nakasugi et al. | 123/184.38 |

FOREIGN PATENT DOCUMENTS

| | | | | |
|---|---|---|---|---|
| EP | 0523029 | | 1/1993 | ............ F02M 25/06 |
| EP | 1128057 | A1 * | 8/2001 | ........... F02M 35/104 |
| EP | 1493907 | | 1/2005 | ............ F02M 25/07 |
| FR | 2879235 | | 6/2006 | ............ F02B 37/007 |
| FR | 2895461 | | 6/2007 | ............ F02M 25/07 |
| JP | 08144868 | A * | 6/1996 | ........... F02M 35/104 |
| JP | 10266903 | A * | 10/1998 | ........... F02M 35/104 |
| KR | 2007046570 | A * | 5/2007 | ........... F02M 35/104 |
| WO | 9854449 | | 12/1998 | ............ F02M 25/07 |

OTHER PUBLICATIONS

Fully certified English transaltion of the reference to Sumser et al. (Pub. No. DE 19603591 C1), published on Mar. 6, 1997.*

Fully certified English transaltion of the reference to Kinuhata et al. (Pub. No. JP 08-144868 A), published on Jun. 4, 1996.*

* cited by examiner

TURBOCHARGED ENGINE WITH EXHAUST GAS RECYCLING

RELATION TO OTHER PATENT APPLICATIONS

This application is the U.S. National Phase of PCT/EP2010/000924 filed Feb. 15, 2010, with the same title, and claims priority to European Patent Application No. 09002111.4, filed Feb. 16, 2009.

TECHNICAL FIELD

The present disclosure refers to a turbocharged engine with exhaust gas recycling, e.g., a Diesel internal combustion engine, adapted to be used, e.g., in heavy-duty vehicles, ships or power stations, but not restricted to these applications.

BACKGROUND

Turbo charging is a common means to increase torque and power of an internal combustion engine. Exhaust gas recycling is a common means to improve exhaust gas quality, i.e., to decrease the content of nitrogen oxide in the exhaust gas. When combining external exhaust gas recycling (i.e., guiding some of the exhaust from an exhaust manifold of the engine to an intake manifold of the engine) with turbo charging, it is necessary to increase the pressure of the exhaust recycled to the intake manifold to a pressure level which is at least the same as the pressure level of the pressurized fresh air in the intake manifold.

DE 196 03 591 C1 discloses a turbocharged internal combustion engine with a fresh air turbocharger and an exhaust turbocharger, wherein an exhaust conduit is connected to an inlet of the turbine of the exhaust turbocharger and an inlet of the turbine of the fresh air turbocharger and, in addition, to an inlet of the compressor of the exhaust turbocharger. The outlet of the exhaust turbocharger is connected to a conduit connecting the outlet of a compressor of the fresh air turbocharger to the engine. Upstream of the compressor of the exhaust turbocharger and downstream of the compressor of the fresh air turbocharger are provided coolers. A control valve is connected to the inlets of the compressor and the turbine of the exhaust turbocharger and an exhaust outlet of the engine to control the rate of exhaust recycling.

DE 44 36 732 A1 discloses a turbocharged internal combustion engine with a fresh air turbocharger and an exhaust turbocharger with the inlets of their turbines being connected in parallel to the exhaust side of the engine. The exhaust side of the engine is, in addition, connected via a cooler to an inlet of the compressor of the exhaust turbocharger. The outlet of the compressor of the exhaust turbocharger is connected to an inlet manifold of the combustion engine, which inlet manifold is also connected via a cooler to an outlet of the compressor of the fresh air turbocharger. For the purpose of controlling the exhaust recirculating rate, a control valve is provided upstream of the inlet of the turbine of the exhaust turbocharger.

The present disclosure is directed, at least in part, to improving or overcoming one or more aspects of prior turbocharged internal combustion engines with exhaust recycling, as, e.g., mounting efforts, complexity and/or efficiency.

SUMMARY OF THE DISCLOSURE

According to a first aspect of the present disclosure, a turbocharged internal combustion engine comprises a plurality of cylinders, each having at least one inlet opening and at least one exhaust opening, an intake manifold connected to said inlet openings, and an exhaust manifold connected to said exhaust openings. Furthermore, the engine may comprise a fresh air turbocharger including a turbine, the inlet of which is connected to the exhaust manifold and the outlet of which is connected to the atmosphere, and a fresh air compressor, an inlet of which is connected to the atmosphere and an outlet of which is connected to the intake manifold. In addition, the engine may comprise an exhaust supercharger including a compressor, the inlet of which is adapted to be supplied with exhaust from the exhaust manifold and the outlet of which is connected to the intake manifold. The intake manifold may be divided by a separating wall into a fresh air passage and an exhaust passage, one of these passages being connected to the inlet openings, the fresh air passage being connected to the outlet of the fresh air compressor, the exhaust passage being connected to the outlet of the compressor of the exhaust supercharger, and the separating wall being formed with orifices connecting the two passages.

According to a further aspect of the present disclosure a turbocharged internal combustion engine may comprise a plurality of cylinders, each having at least one inlet opening and one exhaust opening. An intake manifold may be connected to said inlet openings and an exhaust manifold may be connected to said exhaust openings. A fresh air turbocharger comprises a turbine, the inlet of which is connected to the exhaust manifold and the outlet of which is connected to the atmosphere, and further comprises a fresh air compressor, the inlet of which is connected to the atmosphere and the outlet of which is connected to the intake manifold. An exhaust supercharger comprises a compressor, an outlet of which is connected to the intake manifold. The inlet of the compressor of the exhaust supercharger is selectively connectable to the exhaust manifold or to the atmosphere.

According to another aspect of the present disclosure a method to control the operation of a turbocharged internal combustion engine is disclosed. The engine comprises a plurality of cylinders, each having at least one inlet opening and one exhaust opening, an intake manifold connected to said inlet openings, an exhaust manifold connected to said exhaust openings, a fresh air turbocharger with a turbine, the inlet of which is connected to the exhaust manifold and the outlet of which is connected to the atmosphere, and with a compressor, the inlet of which is connected to the atmosphere and the outlet of which is connected to the intake manifold, and an exhaust supercharger with a compressor, the outlet of which is connected to the intake manifold. The method may comprise the step of selectively supplying the inlet of the compressor of the exhaust supercharger with exhaust from the internal combustion engine and/or with fresh air from the atmosphere.

Other features and aspects of this disclosure will be apparent from the following description and the accompanying drawings.

BRIEF DESCRIPTION OF THE DRAWINGS

The accompanying drawings, which are incorporated herein and constitute part of the specification, illustrate exemplary embodiments of the disclosure, and, together with the description, serve to explain the principles of the disclosure. In the drawings.

DETAILED DESCRIPTION

The same reference numerals are used for corresponding elements in all figures.

An exemplary embodiment of a turbocharged internal combustion engine with exhaust recycling will be described in the following with reference to FIGS. 1 and 2.

An internal combustion engine 8, e.g. an inline 5-cylinder engine, may comprise a crankcase 10 within which a crankshaft 12 is supported. The crankshaft 12 is indicated by a double-dotted line. The crankshaft 12 is connected to pistons (not shown), which are movable within respective cylinders 14a-14e.

The engine 8 as illustrated has end sides 16, 18, being opposite in a length-wise direction of a crankshaft 12, and sides 20, 22, being opposite in a direction orthogonal to the lengthwise direction of the crankshaft 12.

An intake manifold 24 extends along the side 20 of the engine and is connected to each of the cylinders 14a-14e. Each of the cylinders 14a-14e may be provided with at least one inlet valve, which is adapted to open or close the connection between the intake manifold 24 and a working chamber of the respective cylinder. At the other side 22, an exhaust manifold 26 may be provided, which may be connected to each of the cylinders 14a-14e. Each of the cylinders 14a-14e may be provided with at least one exhaust valve configured to open and close the connection between the working chamber within the respective cylinder 14a-14e and the exhaust manifold.

At one of the end sides 16, 18, in the illustrated embodiment at the side 18, there may be located a fresh air turbocharger 28 comprising a compressor 30 and a turbine 32 connected via a shaft 34.

An inlet 36 of the compressor 30 may be connected to the outside atmosphere. An outlet 38 of the compressor 30 may be connected to the intake manifold 24, wherein a cooler 40 may be provided between the outlet 38 and the intake manifold 24.

The inlet 42 of the turbine 32 may be connected to the exhaust manifold 26. The outlet 44 of the turbine 32 may be connected to an exhaust system of the engine, which includes means for exhaust purification and sound dampening.

At side 16 of the engine 8 there is located an exhaust turbocharger 46 comprising a compressor 48 and a turbine 50 rotably connected via a shaft 52.

The inlet 54 of the turbine 50 is connected to the exhaust manifold 26, wherein a first control valve 56 may be provided between the turbine 50 and the exhaust manifold 26. The outlet 58 of the turbine 50 is connected to an exhaust system of the engine similarly to the outlet 44 of turbine 32.

The inlet 60 of the compressor 48 of the exhaust turbocharger 46 is connected to the exhaust manifold with a second control valve 64 via conduit 62, and a cooler 66 may be provided in conduit 62. The outlet 68 of the compressor 48 is connected to the intake manifold 24.

Figure 2:
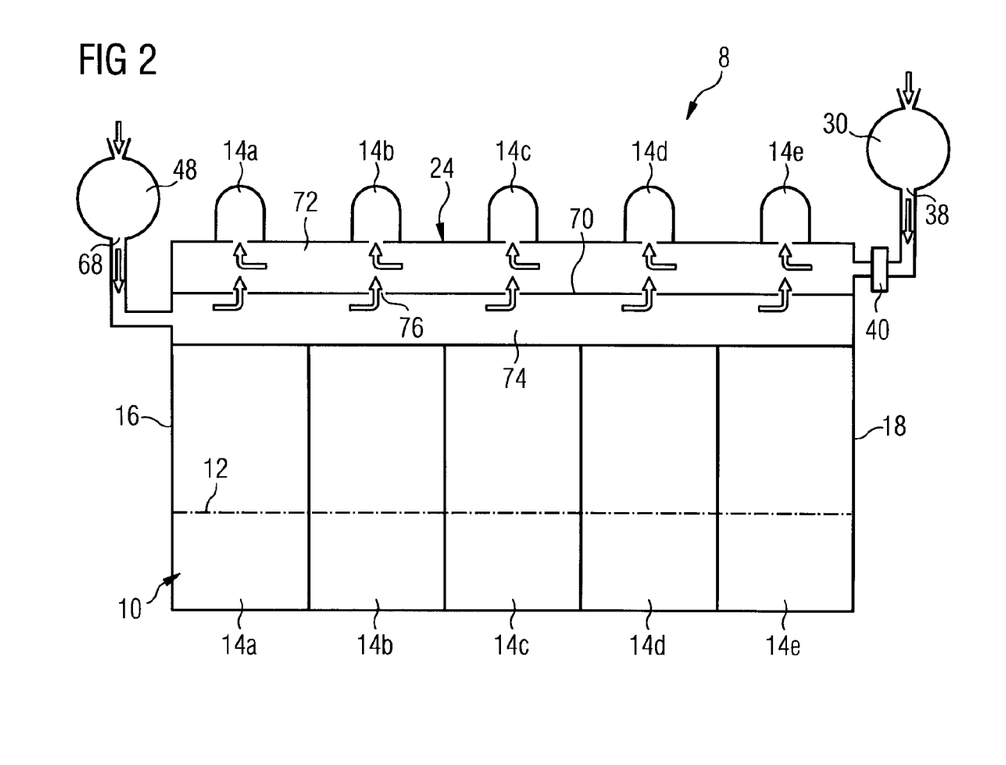
FIG. 2 is a schematic side view of the exemplary embodiment of FIG. 1.

As can be seen from FIG. 2, the intake manifold 24, which may be integrally cast with the crankcase 10, is divided by a separating wall 70 into a fresh air passage 72 and an exhaust passage 74 in its lengthwise direction. The fresh air passage 70 is closed at its end next to side 16 of the engine, and is connected at its end close to side 18 of the engine to the outlet 38 of compressor 30. The exhaust passage 74 is closed at its end near side 18 of the engine, and is connected to the compressor 48 of the exhaust turbocharger 46 at its end close to side 16 of the engine. Preferably, fresh air passage 72 is located above exhaust passage 74. Fresh air passage 72 is directly connected to cylinders 14a-14e, whereas exhaust passage 74 communicates with fresh air passage 72 via orifices 76 formed in the separating wall 70. Preferably, at least one of the orifices 76 is located at a position corresponding to a respective of the cylinders 14a-14e.

Figure 1:
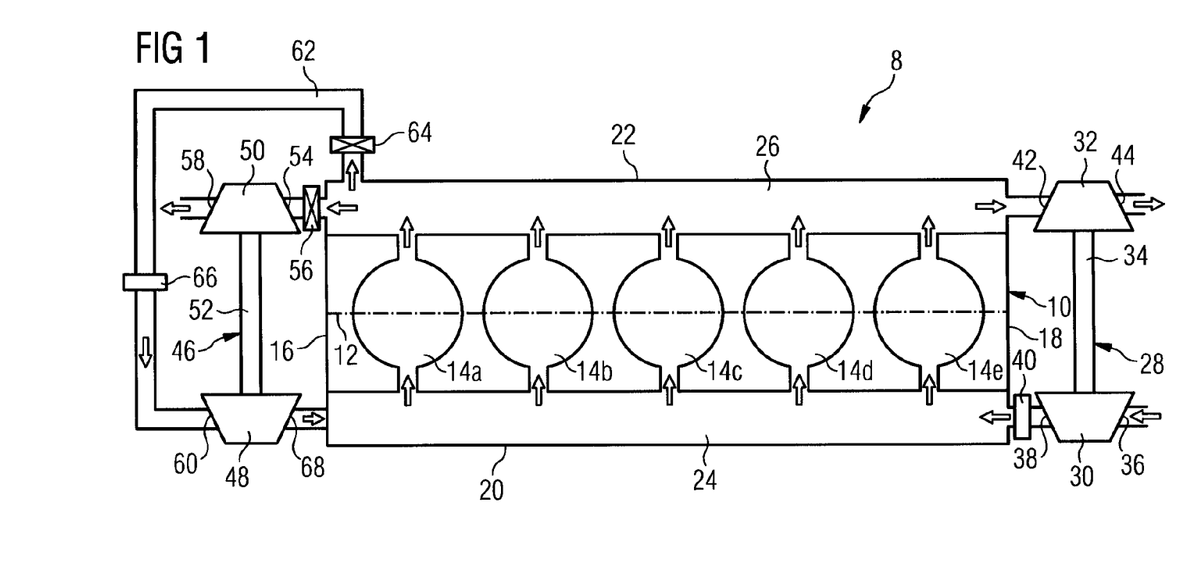
FIG. 1 is a schematic top view of an exemplary embodiment of the present disclosure.
Figure 3:
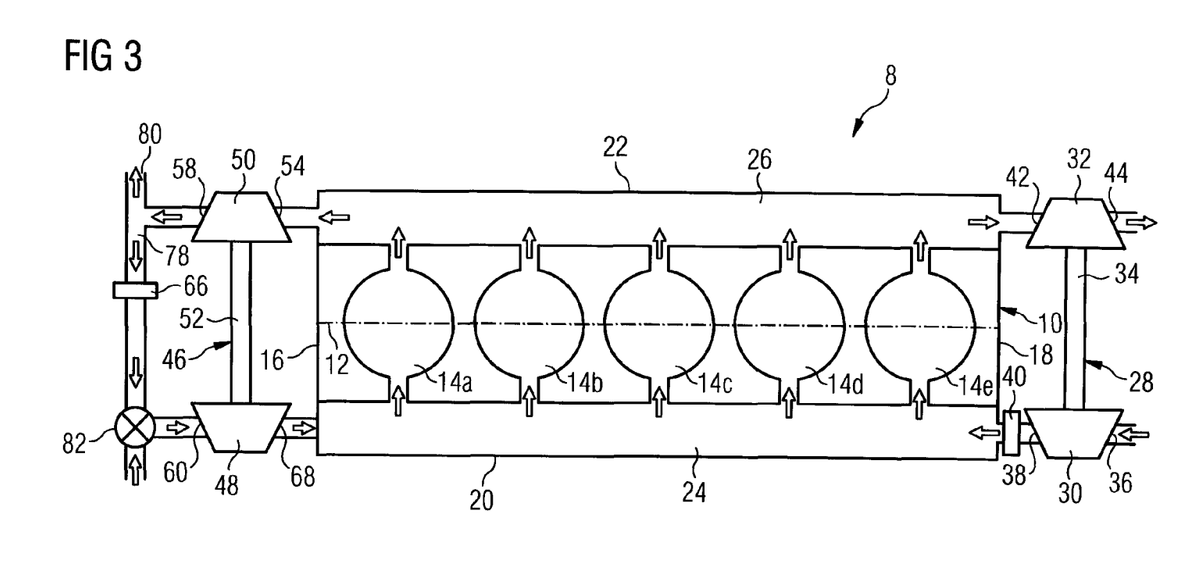
FIG. 3 is a schematic top view of a further exemplary embodiment of the present disclosure.

FIG. 3 shows a second embodiment of a turbocharged internal combustion engine, wherein the piping of the exhaust turbocharger 46 has been modified versus the embodiment of FIG. 1. In the following only, those parts of the embodiment of FIG. 3 are described which are amended versus the embodiment of FIG. 1:

There is no control valve in the connection between exhaust manifold 26 and inlet 54 of turbine 50 of exhaust turbocharger 46. Furthermore, outlet 58 of turbine 50 is connected to a conduit 78 which at one end 80 is connected to an exhaust system of the engine and is connected at its other end to a control valve 82, by which conduit 78 may be connected to inlet 60 of compressor 48 of exhaust turbocharger 46 or to the outer atmosphere. Between the connection of conduit 78 to turbine 50 and valve 82, there is provided a cooler 66.

Figure 4:
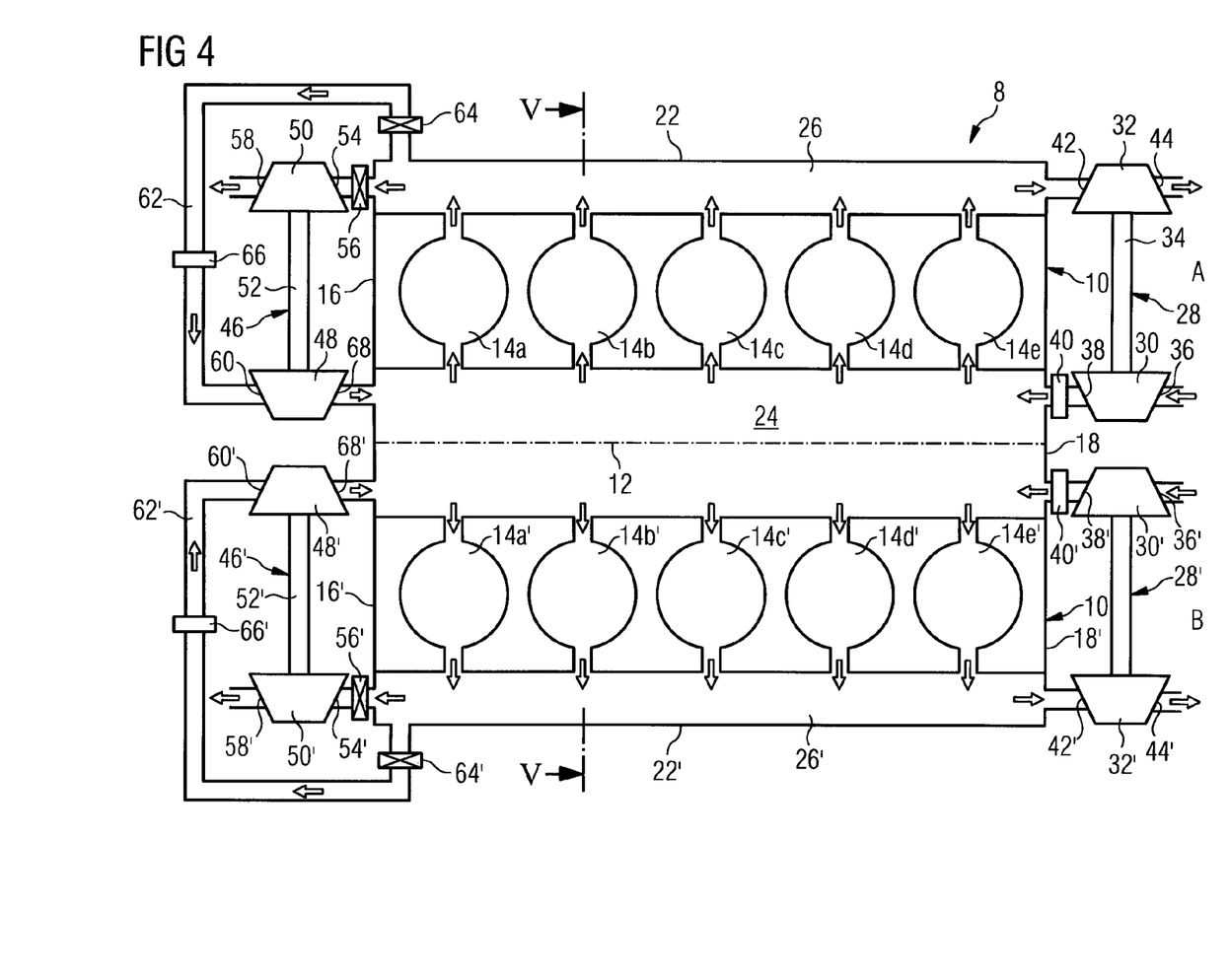
FIG. 4 is a schematic top view of an exemplary embodiment of a V-type engine.

FIG. 4 discloses a V-engine including two cylinder banks A and B corresponding to the cylinder bank of FIG. 1, but mirrored with respect to a vertical central plane of the engine including its crankshaft 12.

Figure 5:
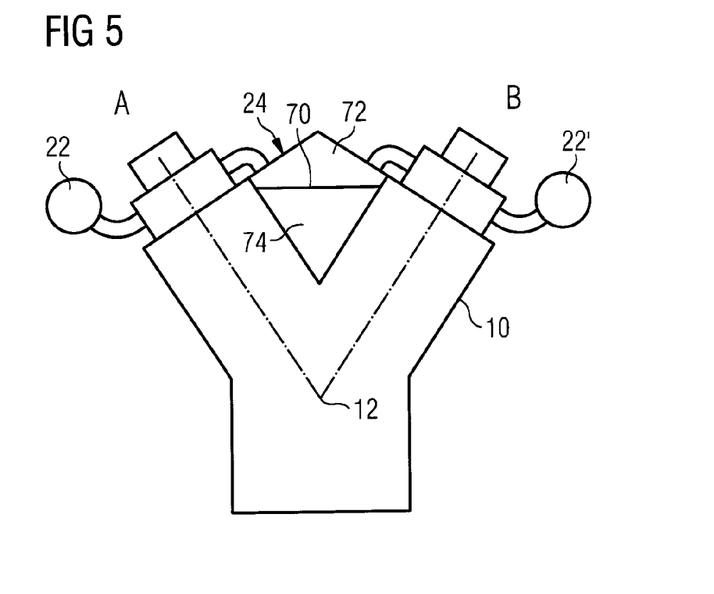
FIG. 5 is a schematic cross-sectional view of the engine in the plane V-V shown in FIG. 4.

As can be best seen from FIG. 5, which is a cross-sectional view of the engine along plane V-V shown in FIG. 4, the intake manifold 24 is located between the cylinder banks A and B. Fresh air passage 72 is connected to the compressors 30, 30' of both fresh air turbochargers 28, 28', whereas outlets 68, 68' of both exhaust gas turbochargers are connected to exhaust passage 74.

Figure 6:
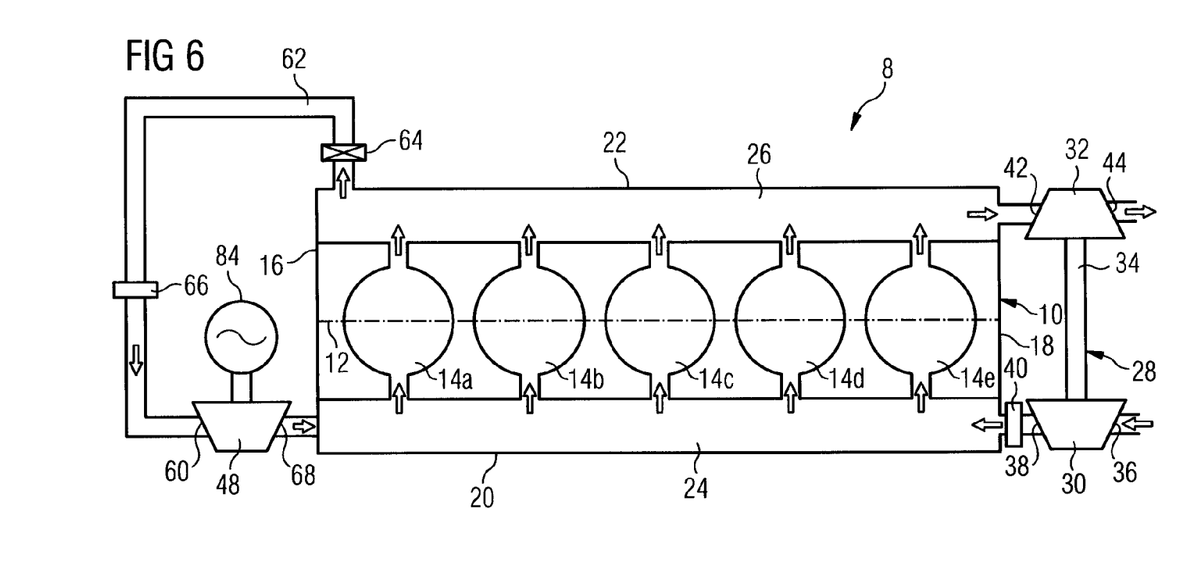
FIG. 6 is a schematic top view of an embodiment modified versus the embodiment of FIG. 1.

FIG. 6 illustrates an embodiment of the present disclosure modified versus the embodiment of FIG. 1. Only the modifications versus FIG. 1 will be described:

According to FIG. 1 the compressor 48, which constitutes an exhaust supercharger driven by the turbine 50 of the exhaust turbocharger 46 is rotably driven by an electric motor 84, which is controlled by an electronic control unit (not shown) so that the compressor 48, which constitutes a supercharger, supplies exhaust at a rate and at a pressure to the exhaust passage 74 of the intake manifold 24, according to the operating status of the combustion engine 8, i.e. corresponding to the load and the speed of the engine. Because the electric motor 84 may be directly controlled according to the operating status of the engine the second control valve 64 may be omitted.

Of course, the embodiment of FIG. 6 could be applied also to the embodiment of FIG. 4, wherein both compressors 48, 48' of the embodiments of FIG. 4 could be rotably driven by respective electric motors or by a common electric motor.

Figure 7:
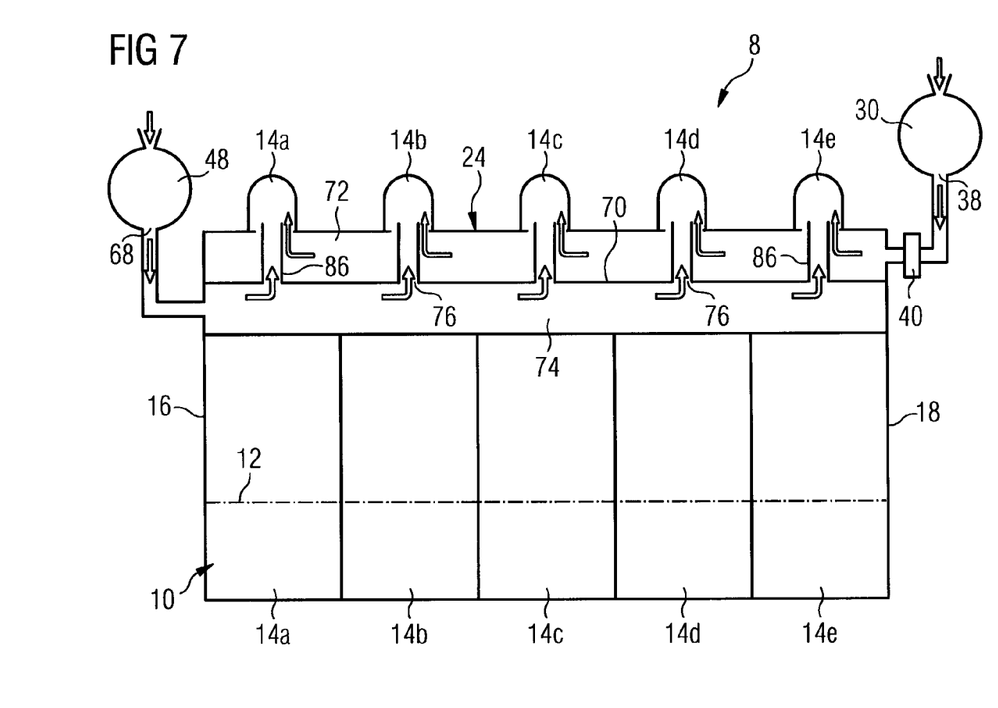
FIG. 7 is a schematic side view of an embodiment modified versus the embodiment according to FIG. 2.

FIG. 7 shows an embodiment of the present disclosure modified versus the embodiment of FIG. 2. In the following only the modifications will be described:

Whereas in the embodiment of FIG. 2 the orifices 76, which connect the interior of the exhaust passage 74 to the interior of the fresh air passage 72 are formed as simple holes in the separating wall 70 with the embodiment of FIG. 7. These orifices 76 are formed by interior passages of tubes 86, which extend from the separating wall 70 in an upward direction. Preferably the tubes 86 are formed so that their free ends (the ends, which are distant from the exhaust passage) open directly into conduits, which connect the cylinders 14a to 14e to the fresh air passage 72, so that the exhaust from the exhaust passage 74 flows within the flow of fresh air from the fresh air passage 72 into the respective cylinder. By the tubes 86 it is assured that any droplets within the exhaust, which might condense from the exhaust by a temperature decrease of the exhaust, are directly transported into the cylinders without condensing at any interior surface of the fresh air passage 72.

Figure 8:
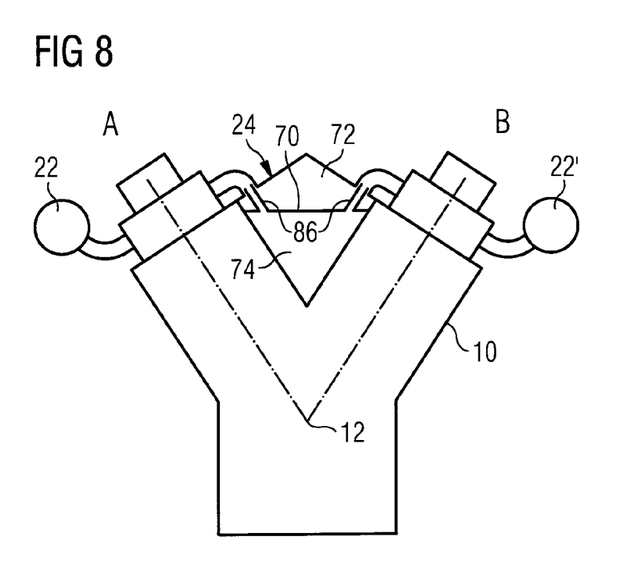
FIG. 8 is a schematic cross-sectional view of a modification of the engine as shown in FIG. 5.

FIG. 8 is a view similar to FIG. 5 and shows how the tubes 86, which have been explained before, are arranged in a V-engine with two cylinder bings A and B.

INDUSTRIAL APPLICABILITY

The function of the engine, which can be used e.g., as on drive engine in heavy duty trucks, according to FIG. 1 is as follows:

When the engine is running, turbine 32 of fresh air compressor 28 and turbine 50 of exhaust compressor 46 are driven by exhaust exiting from both ends of exhaust manifold 26. Turbine 32 drives compressor 30, so that compressed fresh air, which is cooled in cooler 40 flows into intake manifold 24.

Turbine 50 of exhaust turbocharger 46 drives compressor 48, whereby exhaust exiting from exhaust manifold 26 and cooled in cooler 66 is compressed by compressor 48 to a pressure similar or slightly above the pressure of the compressed fresh air in the fresh air passage 72, so that compressed exhaust flows through orifices 76 into fresh air passage 72, where it mixes with compressed fresh air. The mixture of compressed fresh air and compressed exhaust flows into the working chambers of the cylinders.

The rate of exhaust recirculated into exhaust passage 74 may be controlled by control valves 56 and 64, wherein control valve 56 controls the driving power of turbine 50, and control valve 64 controls the effective cross-section of conduit 62.

Control valves 64 and 56 are controlled by a control means of the engine according to operating parameters of the engine, e.g., load, speed and temperature.

By mounting the turbochargers at opposite sides of the engines, mounting is simplified and space is effectively used. Furthermore, any flow losses are minimized by the compact arrangement.

With the design of the intake manifold 24 being divided by the separating wall 70 into the fresh air passage 72 and the exhaust passage 74, a compact and effective design is achieved. Due to the orifices 76 connecting the fresh air passage 72 and the exhaust passage 74, an effective mixture between the recirculated exhaust and the fresh air is achieved.

The coolers 40 and 66, which may be heat exchangers, wherein heat from the gas is removed by cooling water from the engine, increase overall efficiency.

With the two control valves 56 and 64, an effective control of the exhaust recirculating rate is possible.

The design parameters of exhaust gas turbocharger 46 and fresh air turbocharger 28 are set as to fulfill the functional requirements of the engine with respect to exhaust recirculating rate, depending on the operating parameters of the engine.

The basic design of the engine as described may be modified in many respects. The design may be used for Otto engines and Diesel engines, engines burning liquid or gaseous fuels, and engines with different numbers of cylinders. Furthermore, the intake manifold 24 is not restricted to a member integrated with the crank case 10, but may be a separate member mounted to the engine body. Any of the coolers 40 or 66 may be omitted. The location of the control valves may be changed. Conduit 62 may be connected to the outlet 58 of turbine 50.

Exhaust passage 64 is not restricted to be located below fresh air passage 72.

The embodiment of FIG. 3 differs from the embodiment of FIG. 1 in the connections of the outlet 58 of turbine 50 and inlet 60 of compressor 48 of the exhaust turbocharger. In a status of valve 82 in which conduit 78 is connected to the inlet 60 of compressor 48, exhaust gas is pressurized in compressor 48 and supplied to exhaust manifold 26 (FIG. 2). It should be mentioned that conduit 78 could be connected directly to exhaust manifold 26, as it is in the embodiment of FIG. 1.

When valve 82 is switched to a status in which conduit 78 is separated from inlet 60 and inlet 60 is connected to the outer atmosphere, exhaust turbocharger 46 functions as an additional fresh air turbocharger, similar to fresh air turbocharger 28. In this stage there is no exhaust gas recirculation, but an efficient turbo charging of the engine. Valve 82 may be a proportional valve that allows a control of the exhaust gas recirculation rate between a maximum (inlet 60 only connected to conduit 78) and a minimum (inlet 60 fully separated from conduit 78). There are a lot of applications in which it may be advantageous to operate an engine with or without exhaust gas recycling. A closure of the inlet 54 of turbine 50 would result to an increased exhaust pressure in exhaust manifold 26, which would result in an overload of fresh air turbocharger 28. Switching the exhaust turbocharger 46 from exhaust compressing to fresh air compressing overcomes this problem.

The embodiment of FIG. 4 corresponds to the embodiment of FIG. 1, but applies this technique to a V6 engine. Using one common intake manifold 24 for cylinder banks A and B allows a compact design with short conduits and low flow losses. Of course, the arrangement of the exhaust turbocharger according to FIG. 3 could also be applied to FIG. 4. Furthermore, turbines 48 and 48' of the exhaust gas compressors 46 and 46' could be combined into one compressor driven by two turbines 50, 50'. Instead of two turbines 50, 50', only one turbine may be provided, wherein the inlet of this turbine may be connected to exhaust manifolds 26 and 26'. Furthermore, only one compressor may be used instead of compressors 30 and 30', and only one turbine may be used instead of both turbines 32 and 32'. The arrangement of the exhaust gas turbocharger 46 according to FIG. 3, which allows the operation of the exhaust gas turbocharger to be switched from exhaust recycling to fresh air compressing may be used also with an engine not provided with an intake manifold, and separated by a separating wall into two passages. The exhaust pressurized by compressor 48, or the fresh air pressurized by compressor 48, may be supplied directly to an intake manifold of the engine or to a conduit connected to the intake manifold.

In the foregoing the function of different embodiments of the engine have been described referring to FIGS. 1 to 5. Substituting the turbine 50 of the exhaust turbocharger 46 by the electric motor 84 according to FIG. 6 allows by controlling the speed of the electric motor 84 to pressurize or supercharge the exhaust delivered to the exhaust passage 74 and/or the fresh air delivered to the exhaust passage 74 with the embodiment of FIG. 3. In addition, use of the electric motor 84 instead of the turbine 50 allows to increase supercharging of the engine by compressor 30, because the whole exhaust can be used to drive turbine 32 of the fresh air turbocharger 28. Use of tubes 86 according to FIG. 7 or 8 avoids any risk that drop lets condensing by decreasing the temperature of recycled exhaust gas may deposit at an interior surface of the fresh air passage 72.

The effective flow through cross sections for exhaust flowing from the exhaust passage 74 to the cylinders 14a to 14e via the orifices 76 or the tubes 86 and for fresh air flowing from the fresh air passage 72 to the cylinders 14a to 14e may not be constant along the length of the manifold 24. It may be modified e.g. by the number of orifices 76 and/or the cross section of the orifices 76 or the tubes 86 corresponding to the different cylinders as to assure that all cylinders are supplied with the same amount of mixture of fresh air and exhaust having a unitary ratio of fresh air to exhaust.

Although the preferred embodiments of this invention have been described herein, improvements and modifications may be incorporated without departing from the scope of the following claims.

What is claimed is:

1. A turbocharged internal combustion engine with exhaust recycling, comprising:
    an internal combustion engine including a plurality of cylinders, each cylinder having at least one inlet opening and at least one exhaust gas opening,
    an intake manifold connected to said inlet openings,
    an exhaust manifold connected to said exhaust gas openings,
    a fresh air turbocharger including a first turbine, the inlet of said first turbine is connected to the exhaust manifold and the outlet of said first turbine is connected to the atmosphere, and a fresh air compressor, the inlet of which is connected to the atmosphere and the outlet of which is connected to the intake manifold, and
    an exhaust supercharger including, a compressor, the inlet of which is supplied with exhaust from the exhaust manifold and the outlet of which is connected to the intake manifold,
    wherein the intake manifold is divided by a separating wall into a fresh air passage and an exhaust passage, one of the passages being connected to the inlet openings of the cylinders,
    wherein the fresh air passage is connected to the outlet of the compressor of the fresh air turbocharger,
    the exhaust passage is connected to the outlet of the compressor of the exhaust supercharger, and the separating wall is formed with orifices connecting the two passages,
    wherein the compressor of the exhaust supercharger is driven by a second turbine, the inlet of said second turbine is connected to the exhaust manifold and the outlet of said second turbine is connected to the atmosphere,
    wherein a control valve is provided between the exhaust manifold and the inlet of the second turbine of the exhaust turbocharger,
    wherein the intake manifold is formed integrally with a crankcase of the engine,
    wherein the fresh air passage is located above the exhaust passage and is directly connected to the inlet openings of the cylinders, and
    wherein the orifices connecting the two passages are formed by tubes extending from the separating wall in an upward direction.

2. A turbocharged combustion engine according to claim 1 wherein the internal combustion engine comprises a crankshaft configured to cooperate with pistons arranged within the plurality of cylinders, the fresh air turbocharger is located at a side of the engine near to one end of the crankshaft, and the exhaust supercharger is located at a side of the engine near to the other end of the crankshaft.

3. A turbocharged internal combustion engine according to claim 1, wherein the outlet of the second turbine is also connected to the inlet of the compressor of the exhaust supercharger.

4. A turbocharged internal combustion engine according to claim 1, wherein the inlet of the compressor of the exhaust supercharger is connected to the exhaust manifold.

5. A turbocharged internal combustion engine according to claim 1, wherein a valve is disposed upstream of the inlet of the compressor of the exhaust supercharger, by which the inlet of the compressor of the exhaust turbocharger is selectively connectable to a conduit supplied with exhaust gas or to the atmosphere.

6. A turbocharged internal combustion engine according to claim 1, wherein the inlet of the compressor of the exhaust supercharger is selectively connectable to the exhaust manifold or to the atmosphere.

7. A turbocharged internal combustion engine according to claim 1, wherein an exhaust cooler is disposed upstream of the inlet of the compressor of the exhaust supercharger.

8. A turbocharged internal combustion engine according to claim 1, wherein a fresh air cooler is disposed between the fresh air compressor and the fresh air passage of the intake manifold.

9. A turbocharged internal combustion engine according to claim 1, wherein the control valve is a first control valve and a second control valve is provided upstream of the compressor of the exhaust turbocharger and is adapted to control the flow of exhaust gas to the exhaust compressor.

10. A turbocharged internal combustion engine according to claim 1, wherein the internal combustion engine is a V-type engine and the intake manifold is located between two cylinder banks of the engine.

* * * * *

UNITED STATES PATENT AND TRADEMARK OFFICE
CERTIFICATE OF CORRECTION

PATENT NO. : 8,919,121 B2  
APPLICATION NO. : 13/201657  
DATED : December 30, 2014  
INVENTOR(S) : Udo Schlemmer-Kelling It is certified that error appears in the above-identified patent and that said Letters Patent is hereby corrected as shown below:

References Cited

Page 2, Column 2, (Other Publications), line 1, delete "transaltion" and insert -- translation --.

Page 2, Column 2, (Other Publications), line 3, delete "transaltion" and insert -- translation --.

Signed and Sealed this  
Seventeenth Day of November, 2015

Michelle K. Lee  
*Director of the United States Patent and Trademark Office*